United States Patent
Wintrell

[11] 3,750,375
[45] Aug. 7, 1973

[54] HYDRAULIC VENTURI

[75] Inventor: Reginald Wintrell, Gibsonia, Pa.

[73] Assignee: Koppers Company Inc., Pittsburgh, Pa.

[22] Filed: May 25, 1971

[21] Appl. No.: 146,638

[52] U.S. Cl. ............... 55/223, 55/225, 55/227, 55/239, 261/118, 261/119 R, 261/DIG. 54
[51] Int. Cl. ............................................. B01d 47/10
[58] Field of Search .................. 261/66, 118–119, 261/126, DIG. 54; 55/223, 225–229, 239, 244, 248–249, 245, 220

[56] References Cited
UNITED STATES PATENTS

| | | | |
|---|---|---|---|
| 3,350,322 | 10/1967 | Waterhouse | 55/227 X |
| 3,130,024 | 4/1964 | Vaughan | 55/227 |
| 1,493,579 | 5/1924 | Walter | 55/227 X |
| 1,182,543 | 5/1916 | Ferguson | 261/DIG. 54 |
| 1,718,988 | 7/1929 | Stewart | 261/118 |
| 1,838,511 | 12/1931 | Wilson | 55/249 |
| 3,061,993 | 11/1962 | Gustavsson | 55/248 |
| 3,321,191 | 5/1967 | Najarian | 55/225 X |
| 3,325,975 | 6/1967 | Coverston | 55/225 |
| 3,343,341 | 9/1967 | Wiemer | 261/118 X |
| 3,626,672 | 12/1971 | Burbidge | 261/126 X |
| 3,648,440 | 3/1972 | Egan | 55/226 |

Primary Examiner—Frank W. Lutter
Assistant Examiner—Vincent Gifford
Attorney—Sherman H. Barber, Oscar B. Brumback and Olin E. Williams

[57] ABSTRACT

Dirty gases entering a chamber pass through a zone in which they are treated with primary water sprays, and thereafter the gases impinge on a confined mass of water. The gases then pass through a peripheral venturi section and through another zone in which they are treated for a second time with venturi water sprays.

1 Claim, 1 Drawing Figure

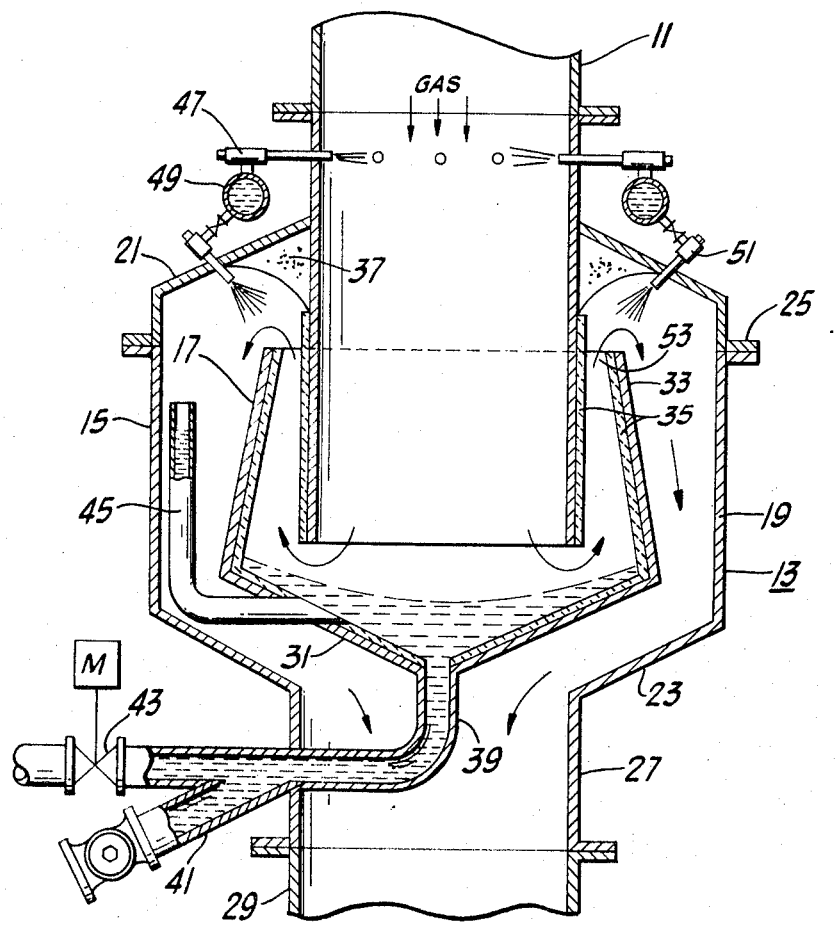

HYDRAULIC VENTURI

BRIEF SUMMARY OF THE INVENTION

Dirty gases from a blast furnace or the like are sprayed upon entering a hydraulic retention chamber and coarse or primary dust is entrained by the spray and settles into the chamber reservoir.

After this primary cleaning, the gases enter a peripheral venturi and they are subjected there to further or secondary cleaning by a change in direction of flow and by an increase in the velocity of flow. The velocity of flow increase occurs at the entry to the venturi by means of a partial water barrier. The water, being subjected to the kinetic thrust of the gases, is partially entrapped and is disintegrated within the gas flow.

Increasing the gas flow velocity at entry to and through the venturi causes added breakdown or atomization of the water particle sizes. At discharge from the mouth of the venturi, both the change in gas flow direction and the resulting turbulence cause the finer dust and atomized water to collide. There is then a tertiary and final stage of gas cleaning.

For a further understanding of the invention and for features and advantages thereof reference may be made to the following description and the drawing which illustrates a preferred embodiment of equipment in accordance with the invention.

DETAILED DESCRIPTION

Referring to the drawing, a gas conduit 11 which is carrying dirty gases from a BOF installation and the like is surrounded by a venturi 13 comprising an outer chamber 15 and an inner hydraulic retention chamber 17.

The outer chamber 15 includes a cylindrical main body portion 19, and both top 21 and bottom 23 frusto-conical portions. The top frusto-conical portion 21 is welded to the gas conduit 11 about where shown in the drawing and the top frusto-conical portion 21 and the main body portion 19 are connected together at mating flanges 25 in a conventional manner. The bottom frusto-conical portion 23 is welded to the cylindrical main body portion 19 and to a length of conduit 27 that is flange-connected to another gas conduit 29.

The inner hydraulic retention chamber 17 is fashioned as a bottom conical portion 31 and a frusto-conical upper portion 33; the larger end of the frusto-conical upper portion 33 being welded to the conical end portion 31, as shown in the drawing. The inner hydraulic retention chamber 17 is axially aligned with the outer chamber 15 and with the gas conduits 11, 27, 29. Further, the inner hydraulic retention chamber 17 surrounds the lower portion of the gas conduit 11 to the extent suggested in the drawing.

It will be noted from the drawing that the inner surface of the hydraulic retention chamber 17 is lined with a suitable material 35, such as a conventional refractory material. Likewise, the outer surface of the gas conduit 11, at least that portion which is within the hydraulic retention chamber 17 is also lined or covered with the same, or another suitable kind of refractory material 35. In like manner, the region 37 wherein the upper frusto-conical portion 21 joins the cylindrical gas conduit 11 is filled with the same or another suitable kind of refractory material that is shaped about as shown in the drawing.

The bottom conical portion 31 is provided with an axial drain conduit 39 which is provided externally with a clean-out connection 41 of conventional design, and a motor driven control valve 43, also of conventional design. Branching off horizontally from the lower part of the bottom conical portion 31 is a safety overflow 45 that is curved and rises to a level somewhat below the top edge of the frusto-conical portion 33.

The gas conduit 11 has a plurality of radially disposed primary spray nozzles 47 disposed in a plane substantially perpendicular to the longitudinal (vertical) axis of the gas conduit 11; the spray nozzles 47 being located just above the plane of intersection of the gas conduit 11 and the top frusto-conical portion 21.

The spray nozzles are fluidly connected to a circular water header 49 disposed in spaced apart relation around the gas conduit 11. The water header 49 is also fluidly connected to an additional plurality of spray nozzles 51 disposed in the top frusto-conical portion 21; each spray nozzle 51 being oriented toward a peripheral venturi 53 formed by and existing between the top edge of the upper frusto-conical portion 33 and the gas conduit 11.

In operation, dirty gases flowing in the conduit 11 pass through a spray zone which is created when the primary water spray nozzles 47 are operating, which is whenever gases are flowing in the gas conduit 11. Coarse or primary dust and dirt particles are entrained in the spray water and they settle into the bottom portion 31 of the chamber reservoir which is kept partially filled with water at all times.

After primary cleaning of the gases in the spray zone, the gases impact the water in the bottom of the chamber reservoir 31 and they reverse their direction of flow, moving upward toward the peripheral venturi 53. The change in direction of flow and the increase in velocity experienced by the gases as they flow through the peripheral venturi 53 effect a secondary cleaning of the gases.

Increasing the velocity of the gas flow through the peripheral venturi results in an additional breakdown or atomization of the water particle size. At discharge of the gases from the peripheral venturi, a further reversal in direction of flow takes place when the gases impact the fillet-shaped refractory material in the region 37. The gas flow is reversed and this produces gas turbulence whereby the fine dust and dirt particles and the atomized water particles collide producing a tertiary cleaning of the gases.

In order to produce more turbulence, higher gas flow velocity, increased atomized water dispersion, and improved gas cleaning, the flow of effluent from the hydraulic venturi is gradually reduced by the motor driven control valve 43. The water level in the hydraulic reservoir chamber rises which reduces the space between the end of the conduit 11 and the water level, that is available to gases flowing toward the peripheral venturi. Since the volume of gases entering the chamber is not reduced, the gas flow velocity through the peripheral venturi increases. Increased water entrainment and increased water atomoization due to turbulence and increased kinetic energy result. The improvement in water atomization along with increased gas flow velocity produces more intimate mixing of the dust and dirt particles with the water particles and more effective gas cleaning.

When the pressure differential between the gas in the hydraulic chamber and the clean gas leaving the chamber exceeds the designed hydraulic head of the safety overflow 45, water will flow through the safety overflow. The water flow will reduce the depth of water in the hydraulic reservoir, thereby providing less resistance to the gas flow and thus restraining the system to a balanced operation. The safety overflow will also automatically control the maximum pressure drop across the venturi in the event of a blockage in axial drain conduit 39.

From the foregoing description of one embodiment of the invention, those skilled in the art should recognize many important features and advantages, among which the following are particularly significant:

There are no internal moving parts of the hydraulic venturi; whereby, significant
wear reduction results from the initial extraction of the coarse primary dust and dirt;

There is hydraulic protection from erosive particle wear in the retention chamber and a considerable increase in the service life of the lining within the chamber; and The service life of the peripheral venturi is greatly increased because of the secondary water sprays in this zone.

Although the invention has been described herein with a certain degree of particularity it is understood that the present disclosure has been made only as an example and that the scope of the invention is defined by what is hereinafter claimed.

What is claimed is:

1. An hydraulic venturi for use in cleaning dirt-laden gases comprising:
   a. an open ended conduit carrying said gases:
   b. a plurality of first spray nozzles in said open ended conduit which are directed toward the gases flowing in said conduit;
   c. a first chamber surrounding the end of said conduit, said chamber having an open end formed by a wall that approaches but does not touch the outer periphery of the end portion of said open ended conduit;
   d. a quantity of water in said first chamber, the level of which is spaced apart from the end of said conduit;
   e. a second chamber surrounding said first chamber and the end portion of said conduit;
   f. a conduit connected to said second chamber for carrying away said gases;
   g. a first tubular conduit terminating with said second chamber at a point above said conduit and communicating with the water in said first chamber;
   h. a second tubular conduit communicating with the water in said first chamber and leading the water therefrom and externally of said second chamber;
   i. flow control means in said second tubular conduit;
   j. means for flowing water in said first spray nozzles and into said gases; and
   k. a plurality of second spray nozzles in said second chamber which are directed toward the space between said open ended conduit and said first chamber.

* * * * *